Patented June 14, 1949

2,473,124

UNITED STATES PATENT OFFICE 2,473,124

POLYALLYL TYPE ALCOHOLS AND PROCESS FOR PRODUCTION THEREOF

David E. Adelson, Berkeley, and Theodore W. Evans, Oakland, Calif., assignors to Shell Development Company, San Francisco, Calif., a corporation of Delaware No Drawing. Application December 31, 1941, Serial No. 425,118

10 Claims. (Cl. 260—80)

This invention relates to a process for the manufacture of polyallyl type alcohols and to the products obtainable thereby. More particularly, the invention pertains to polyallyl alcohol and to a method for its manufacture.

In the copending application of Dannenberg and Adelson, Serial No. 420,388, filed November 25, 1941, now abandoned, there is disclosed and claimed a method of manufacturing a polymer of allyl alcohol or its homologues according to which the allyl alcohol is heated in the presence of an oxygen-yielding polymerization catalyst. This method does not yield a true polymer of the alcohol since while the majority of the monomer units are linked together in the polymer macromolecule by carbon-to-carbon bonding, the oxygen-yielding catalyst employed in the process oxidizes the carbinol group of the alcohol to some extent with the result that the polymer molecules contain, in addition to the unaltered hydroxy groups, a minor amount of ester, aldehyde and/or acid groups. The polymer obtained by direct polymerization has a property which is disadvantageous in some applications thereof. This polymer tends to discolor and darken, especially when heated, even though the initial polymer is colorless. It is believed that such discoloration is due to the presence of other functional groups than hydroxy groups in the polymer.

It is an object of the present invention to provide a polymer of an allyl type alcohol which is resistant to discoloration. Another object of the invention is to provide a novel and useful method for the manufacture of such color stable polymeric alcohols. A further object is to provide a method whereby polyallyl alcohol is produced. Other objects will be apparent from the description of the invention given hereinafter.

We have discovered that by protecting the hydroxy group of an allyl type alcohol by esterification with a carboxylic acid, the resulting compound may be polymerized to form true macromolecules of the ester and that substantially no oxidation or damage of the protected hydroxy groups occurs. Then, according to our invention, such a carboxylic acid ester of the polymeric allyl type alcohol is reacted with a monohydric alcohol, preferably in the presence of a basic metal alcoholate as catalyst, and the resulting carboxylic acid ester of the monohydric alcohol is separated from the reaction mixture as fast as formed, whereby the product obtained is the desired true polymer of the allyl type alcohol.

In this application, the term allyl type alcohol or allylic alcohol refers to an unsaturated alcohol having an olefinic linkage between two carbon atoms, one of which is the carbon atom of a terminal methylene group and the other of which is linked directly to a saturated carbon atom having the hydroxyl group linked directly thereto, which alcohols may be represented by the general formula:

wherein the groups $R_1$, $R_2$, and $R_3$ are the same or different and represent hydrogen atoms, halogen atoms or hydrocarbon radicals such as alkyl groups, alicyclic groups, and aryl groups. The polymers of carboxylic acid esters of such allyl type monohydric alcohols wherein the polymer is formed by carbon to carbon bond coupling or linking through the ethylenic structure of the allylic group. The structure of the macromolecule in polymers of these esters is not definitely known. The polymer molecule of a typical ester like polyalkyl acetate is believed to be representable by the formula:

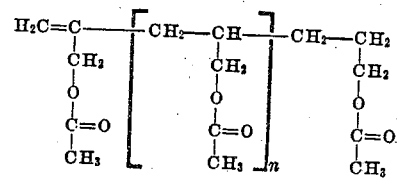

wherein $n$ represents an integer, the value of which is dependent upon the number of monomer units present in the macromolecule. The polymer of polyallyl acetate may also be represented by the following cyclic structure wherein $n$ has the same representation, as above:

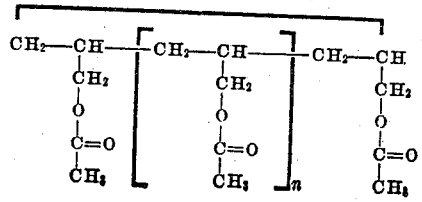

While the true structure of the polymeric esters employed as reactants in the process of the invention is unknown, the above possible structures are suggested for a better understanding of the invention, it being understood that the invention is not to be construed as limited to polymers of such structures.

The process of the invention is an especially suitable method for manufacturing polyallyl type alcohols and polyallyl alcohol in particular. While the same starting material, a carboxylic acid ester of a polymeric allyl type alcohol, may be saponified with a base like sodium hydroxide to produce a polyallyl type alcohol, such a method has the disadvantages that, first, an equivalent amount of base to the polymer reacted must be employed which is expensive and, secondly, the separation of the salts produced from the polyallyl type alcohol is difficult, especially with the polymers of lower allyl type alcohols which are water-soluble. Further, the hydrolysis of the polymeric esters using acidic substances as catalyst has the disadvantage that the polymeric alcohol produced is discolored or has poor color stability. These and other disadvantages of similar methods are obviated by the process of our invention which involved the discovery that polymeric allyl type alcohol which is resistant against discoloration and free or substantially free of undesirable impurities may be obtained by reacting a carboxylic acid ester of a polymeric allylic alcohol with a monohydric alcohol and separating the resulting ester of the monohydric alcohol and carboxylic acid from the reaction mixture.

A variety of compounds in the form of their polymers are suitable for use in the process as reactants. Representative substances suitable for this purpose include such polymers as polyallyl formate, polyallyl acetate, polyallyl propionate, polyallyl butyrate, polyallyl isobutyrate, poly beta-methylallyl acetate, polyallyl ethoxyformate, poly beta - methylallyl methoxyformate, poly alpha - methylallyl formate, poly alpha-phenylallyl acetate, poly beta-phenylallyl isopropoxyformate, poly beta-chlorallyl acetate, polyallyl benzoate, poly beta-ethylallyl acetate, poly beta-methoxyallyl formate, poly diallyl phthalate, poly diallyl maleate, polyallyl alpha-hydroxyisobutyrate, polyallyl acetyl - glycolate, polyallyl stearate, poly diallyl succinate, poly diallyl glutarate, poly diallyl malonate, poly di-beta-methylallyl adipate, poly beta-cyclohexylallyl acetate, polyallyl phenoxyformate, polyallyl alpha-ethoxyacetate and the like.

The reactants or starting materials are polymers of the ester of an allyl type alcohol and a carboxylic acid which acid is preferably devoid of polymerizable unsaturated groups. In general, linear polymers are preferred since such polymers are soluble in various solvents which property facilitates their usefulness. The esters of an allylic alcohol and a polybasic carboxylic acid may be polymerized to either soluble polymers or to insoluble polymers. The insoluble polymers of such esters are gels or more highly polymerized resinous material. These insoluble polymers are not linear but consist of cross-linked or three dimensional molecules which are formed because of the presence of a plurality of functional, unsaturated polymerizable groups in the monomeric esters from which they are derived. Such insoluble polymers constitute a less preferred class of reactants in the process because of lesser reactivity than soluble linear polymers.

The polyallylic alcohol is obtained from the corresponding carboxylic acid ester by an ester exchange reaction with a monohydric alcohol. For this purpose any monohydric alcohol may be employed, but it is preferable, in general, that they be lower members of the series which contain not more than 6 carbon atoms in the molecule, while monohydric alcohols, containing not more than 4 carbon atoms are most preferred. The monohydric alcohol may be either a saturated compound or one which is unsaturated and includes such compounds as methyl alcohol, ethyl alcohol, n-propyl alcohol, isopropyl alcohol, sec-butyl alcohol, n-butyl alcohol, isobutyl alcohol, the amyl alcohols, the hexyl alcohols, octyl alcohol, cyclohexanol, methylcyclo-hexanol, allyl alcohol, beta-methylallyl alcohol, methyl vinyl carbinol, cyclopentanol, beta-phenylallyl alcohol, propargyl alcohol, crotyl alcohol and the like. The primary alcohols are preferred since it is found that these have greater reactivity than the secondary alcohols. It is desirable to employ in the process the same allyl type alcohol as is used in the form of its polymeric carboxylic acid ester as the other reactant in the process since such selection enables the resulting ester which may be recovered to be subjected to polymerization with formation of further polymeric ester. Thus, for example, allyl alcohol may be reacted with polyallyl acetate to produce polyallyl alcohol and monomeric allyl acetate which latter substance may be polymerized to form polyallyl acetate and be again treated in cycle of operations to obtain the desired polyallyl alcohol.

We have found that the desired reaction of the process is effected more efficiently and rapidly in the presence of a catalyst and consequently prefer to execute the process in the presence of such a catalyst. For this purpose, we have found that the basic metal alcoholates are particularly suitable. The basic metal alcoholates include the alcoholates of the metals of group I of the periodic system like lithium, sodium, potassium, etc.; of group II like magnesium, calcium, barium, etc. and of aluminum. The preferred catalysts are the alcoholates of the metals of group I while sodium alcoholate is a most preferred member because of excellent activity and ready availability. The basic metal alcoholate may be derived or derivable from any suitable alcohol. Ordinarily the basic metal alcoholate employed as catalyst is derivable from the same alcohol as is used as reactant in the process, although in some instances it may be convenient to add the basic metal alcoholate of a different alcohol than that which is the reactant. The quantity of catalyst employed in the process may be varied widely. It is usually desirable to use as small an amount as will give efficient reaction rates, since the catalyst or its decomposition products remains as an impurity in the final product unless additional measures are taken for its removal. In general, quantities amounting to about 1 to 5 per cent of the reactants are suitable. It is desirable that the reactants and reaction mixture be substantially anhydrous since the water therein will destroy the catalyst.

Removal of the catalyst from the product upon completion of the conversion operation is usually desirable. While a number of methods may be utilized for this purpose, it is preferred to convert the basic metal alcoholate into a salt which is of limited solubility in the product and filter the product for removal thereof. Thus, for example, the product may be treated with carbon dioxide whereby basic metal bicarbonate is formed from the catalyst which is removed by filtration. In the case where an alcoholate of a group II metal is employed, the product may be treated with an equivalent quantity of sulphuric acid to give the basic metal sulphate which also has limited solubility and is readily removable from the product.

The crude product is purified by dissolving in a suitable solvent such as water or lower alcohols like methyl alcohol, ethyl alcohol, isopropyl alcohol, etc., and treating the solution with a non-solvent for the polymeric product. Suitable non-solvents include lower ketones like acetone, methyl ethyl ketone, etc.; hydrocarbons such as benzene, toluene, hexane, heptane, naphtha, etc.; ethers such as ethyl ether, isoproply ether, etc.; and the like. It is desirable that the solvent and non-solvent combinations be mutually miscible. By adding such a suitable non-solvent to a solution of the product, the polymeric alcohol is precipitated in a finely divided state. If desired, crude reaction mixture containing the remaining alcohol which is not used in converting the polymeric ester to the polymeric alcohol is treated with the nonsolvent for precipitation of the polymeric alcohol therein.

In the process of the invention, the formed ester of the carboxylic acid and the monohydric alcohol employed is separated from the resulting polyallyl type alcohol or, more properly, from the reaction mixture, substantially fast as the ester is formed. A variety of expedients may be utilized to effect the separation such as volatilization, vaporization, distillation, azeotropic distillation and the like. A preferred means is distillation of the formed ester from the reaction mixture. With some of the formed esters, the distillation operation requires special care for execution. Reference is made to those cases where the resulting ester does not form an azeotrope with the monohydric alcohol employed as reactant. A particular case is referred to in this connection, although it is to be understood that the procedure is applicable generally to the invention. When polyallyl ethoxyformate is reacted with ethyl alcohol, there is formed ethyl ethoxyformate. However, the normal boiling point of the formed ethyl ethoxyformate is about 125.8° C. while that of ethyl alcohol is only about 78.4° C. If the reaction mixture is fractionally distilled, it is seen that fractionation first causes removal of the excess ethyl alcohol from the reaction mixture before the ethyl ethoxyformate is removed. The polyallyl ethoxyformate and the ethyl ethoxyformate are in chemical equilibrium in the reaction mixture and this equilibrium is probably such that substantially all of the material is in the form of the polyallyl ethoxyformate. As a result of the equilibrium relationship, the removal of the formed ethyl ethoxyformate according to the above outlined fractionation procedure leaves a residue which consists of the formed polyallyl alcohol plus the unreacted polyallyl ethoxyformate, each of which substances may be considered to be substantially non-volatile. In order to convert all of the polyallyl ethoxyformate into polyallyl alcohol, the operation must be repeated according to this procedure a number of times.

There is a more suitable method for effecting the reaction and removing the formed ester than the somewhat cumbersome procedure described above. By conducting the distilling operation with substantially no fractionation, a distillate is obtained which contains both the ethyl ethoxyformate as well as ethyl alcohol. The reaction is thus driven to completion by such means when a suitable excess of ethyl alcohol over the stoichiometric requirement is employed or ethyl alcohol needed for the reaction is fed into the reaction mixture during the distillation.

A more preferred mode of operation of the process of the invention is to employ as the polymeric reactant a polyallyl type ester of a fatty monobasic carboxylic acid since the resulting ester of the fatty acid and the monohydric alcohol forms an azeotrope or constant boiling mixture with the monohydric alcohol. These reactants include such polymeric substances as polyallyl acetate, polyallyl formate, polyallyl propionate, polyallyl isobutyrate, poly beta-metylallyl acetate, poly beta-ethylallyl butyrate, poly alpha-methylallyl acetate and the like. In executing the process with a polymeric ester of this type, the ester and a lower monohydric alcohol is placed in a reaction vessel fitted with a fractionating column. A basic metal alcoholate is preferably added to the reaction mixture as catalyst and the monohydric alcohol is employed in a quantity such that all of the polymeric ester is converted to polymeric alcohol with removal of all or substantially all of the formed ester as distillate. The reaction mixture is then heated and boiled and the formed ester is distilled as an azeotrope with the monohydric alcohol substantially as fast as formed. After all of the polymeric ester is converted to polymeric alcohol and the resulting formed ester is separated, any remaining monohydric alcohol is distilled from the reaction product.

The products obtained by the process of the invention are very useful and valuable substances. They are compounds of high molecular weight containing a plurality of hydroxy groups which are amorphous solids. The molecular weight of the products varies directly with the molecular weight of the polymeric esters from which they are derived—i. e., the number of monomeric units of alcohol joined or linked into the polymer chain will ordinarily be the same as the number of monomeric units of ester present in the ester polymer. The product molecules thus contain from 4 or 5 to 20 or more hydroxy groups which make them highly desirable for many special applications. Furthermore, the hydroxy groups are present in the polymer molecules in the same structural relationship as they are in the monomeric alcohol from which they are derived. Thus the polyallylic alcohol from a primary alcohol contains primary hydroxy groups and the polyallylic alcohol from a secondary alcohol contains secondary hydroxy groups. This is an advantageous property, since it permits a polymeric alcohol to be prepared which contains a plurality of primary hydroxy groups. In the well known polyvinyl alcohol, all of the hydroxy groups are secondary in character while a compound like glycerol contains both primary and secondary hydroxy groups.

The structure of the products is not definitely known. It is believed that they are linear, open-chain polymers although they may contain a cyclic structure. For example, a typical product of the invention like polyallyl alcohol which is a cream colored, amorphous solid is believed to be representable either by the structural formula

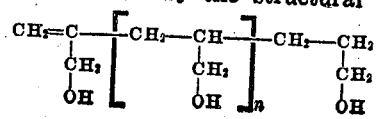

or by the formula

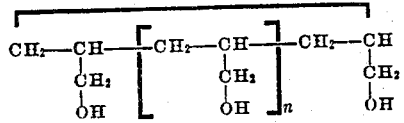

wherein $n$ represents an integer in either formula. The structure of other particular products is believed similar, dependent, of course, upon the particular allyl type alcohol from which they are derived.

While it is ordinarily desirable to effect the process in such a manner that the final polymeric product contains only hydroxy groups, it may in some instances be preferred to only partially alcoholyze the ester whereby the polymeric product is obtained with some hydroxy groups and some remaining ester groups in the molecule. Such partially alcoholyzed polymeric esters have properties which make them useful for particular purposes owing to their difference from either the polymeric ester or the polymeric alcohols. The completely alcoholized polymer containing only hydroxyl groups as the functional groups is an amorphous solid.

The products of the invention have a variety of applications. They are useful in glues, as sizing materials for textiles and fabrics, as greaseproof impregnating agents for paper and the like, as oil-resistant lubricants, etc. The usefulness of the products as chemical intermediates is extensive. They may be reacted with polycarboxylic acids or anhydrides to form new alkyd resins, with unsaturated acids of the drying oil type to form excellent drying oils, with aldehydes to form resinous acetals, with nitric acid to form nitrate explosives, etc.

The following examples are given for the purpose of illustrating the invention in greater detail, it being understood that the particular operative procedures are not to be construed as limitative of the invention.

*Example I*

About 50.6 gms. of polyallyl acetate were dissolved in 248.3 gms. of methyl alcohol contained in a three-necked flask fitted with a thermometer and a gas-inlet tube and connected to an efficient fractionating column. The flask was immersed in a heated oil bath. A solution of 0.50 gm. of sodium in 58.5 gms. of methyl alcohol was added to the flask and the resulting solution refluxed, a slow stream of nitrogen being led into the flask during this operation. Methyl acetate-methyl alcohol azeotrope, B. P. 53.5–54.0° C., was collected in an amount of 44 gms. (95% of theory). The residual solution was treated with carbon dioxide to destroy the catalyst, filtered and treated with 3 liters of acetone. This yielded a cream-colored, soft solid which was dissolved in methyl alcohol reprecipitated by the addition of acetone. A yield of 25.4 gms. of precipitate was obtained. The polyallyl alcohol obtained in this manner was a cream-colored powder which was soluble in water, methyl alcohol, and ethyl alcohol and was insoluble in acetone, benzene, and aliphatic hydrocarbons.

An analysis of the product gave the results tabulated below. The results are not entirely satisfactory since it was found that the polyallyl alcohol was very hygroscopic and absorbed water from the atmosphere during the handling in making the analyses. Further, the sample contained a small quantity of sodium salt as an impurity.

| Analytical Determination | Found | Theory for $(C_3H_6O)n$ |
|---|---|---|
| Carbon, per cent | 58.87 | 62.07 |
| Hydrogen, per cent | 10.18 | 10.34 |
| Oxygen, per cent (by difference) | 30.95 | 27.59 |
| Basicity, equiv. per 100 gm | 0.003 | 0 |
| Mol. wt. (cryoscopic in $H_2O$) | 405±5 | |
| Acetyl Value, equiv. per 100 gm | 1.576 | 1.724 |
| Ester Value, equiv. per 100 gm | 0 | 0 |
| Bromine No., gm. $Br_2$ per 100 gm | 5 | |
| Carbonyl Value, mols. —CO— per 100 gm | 0.041 | 0 |

*Example II*

About 0.5 gm. of sodium was dissolved in 60.6 gms. of dry isopropyl alcohol and the solution was added to a solution of 41.7 gms. of polyallyl acetate contained in 283.4 gms. of isopropyl alcohol. The resulting mixture was refluxed with the aid of an oil bath and isopropyl acetate-isopropyl alcohol azeotrope, B. P. 80.3–81.0° C., was distilled off; about 37 gms. of isopropyl acetate, or 87% of theory, was collected. The polyallyl alcohol thus formed was a very viscous mass which probably contained both acetate and hydroxyl groups in the same molecule.

*Example III*

A solution of about 42.5 gms. of polyallyl acetate and 0.43 gm. of sodium in 266.7 gms. of allyl alcohol was placed in a flask fitted with a stirrer and attached to a short distilling column. The system was swept out with nitrogen and the reactants were stirred and refluxed, heat being supplied with an oil bath. Allyl acetate-allyl alcohol azeotrope was distilled from the reaction mixture substantially as fast as the allyl acetate formed. A total of 40.4 gms. of allyl acetate was collected (95.1% of theory). The residue in the flask was treated with carbon dioxide and poured into 2 liters of acetone; the cream-colored precipitate that formed was dissolved in alcohol and reprecipitated by addition of acetone. This operation yielded about 20.6 gms. of a cream-colored, water-soluble solid.

Results of analyses made on the product are given in the tabulation below. The same difficulties as noted with the product described in Example I were encountered. In addition it was found that the product contained a small quantity of acetone.

| Analytical Determination | Found | Found Value Corrected for $NaHCO_3$ | Theory for $(C_3H_6O)n$ |
|---|---|---|---|
| Carbon, per cent | 55.35 | 57.84 | 62.07 |
| Hydrogen, per cent | 10.45 | 11.08 | 10.34 |
| Sodium, per cent | [1] 1.57 | | 0 |
| Oxygen, per cent (by difference) | 32.63 | 31.08 | 27.59 |
| Mol. wt. (cryoscopic in $H_2O$) | 300 | | |
| Bromine No., gms. $Br_2$ per 100 gms | 9 | | |
| Acetyl Value, equiv. per 100 gms | 1.514 | 1.606 | 1.724 |
| Ester Value, equiv. per 100 gms | 0 | 0 | 0 |
| Acidity, equiv. per 100 gms | 0.0008 | | 0 |
| Carbonyl Value, mols. —CO— per 100 gms | 0.14 | 0.072 | 0 |

[1] This is equivalent to 5.73% $NaHCO_3$.

*Example IV*

About 30.6 gms. of polyallyl acetate were stirred and refluxed with a solution of 0.30 gm. of sodium in 99.9 gms. of ethyl alcohol. Ethyl acetate was removed as distillate azeotropically with ethyl alcohol. The residual polymer was precipitated by addition of benzene to the alcohol solution.

The precipitate was redissolved in ethyl alcohol, carbon dioxide was added (to react with the sodium alcoholate and convert it to sodium carbonate) the solution filtered and the solvent removed by evaporation under reduced pressure. The product was a cream-colored, sticky, solid which was soluble in water and alcohols. The yield amounted to about 15.2 gms. Analyses indicated that the material contained some acetate groups as well as hydroxyl groups. Found: %C, 56.5; %H, 10.2; acetyl value, 1.497 equiv. per 100 gms.; ester value, 0.120 equiv. per 100 gms.

We claim as our invention:

1. A process for the production of polyallyl alcohol which comprises heating and reacting polyallyl acetate with allyl alcohol in the presence of sodium allylate while distilling the formed allyl acetate from the reaction mixture substantially as fast as formed.

2. A process for the production of polyallyl alcohol which comprises heating and reacting polyallyl acetate with allyl alcohol in the presence of a basic metal alcoholate and distilling the formed allyl acetate from the reaction mixture substantially as fast as formed.

3. A process for the production of polyallyl alcohol which comprises heating and reacting polyallyl acetate with methyl alcohol in the presence of an alkali metal alcoholate and distilling the formed methyl acetate from the reaction mixture substantially as fast as formed.

4. A process for the production of polyallyl alcohol which comprises heating and reacting the ester of polyallyl alcohol and a saturated fatty acid with a saturated monohydric primary alcohol containing not more than 4 carbon atoms, said reaction being effected in the presence of a basic metal alcoholate, and distilling the formed fatty acid ester of said monohydric alcohol from the reaction mixture substantially as fast as formed.

5. A process for the production of polyallyl alcohol which comprises heating and reacting polyallyl formate with allyl alcohol while distilling the formed allyl formate from the reaction mixture substantially as fast as formed.

6. A process for the production of polyallyl alcohol which comprises heating and reacting a carboxylic acid ester of polyallyl alcohol with a monohydric alcohol from the class consisting of primary and secondary alcohols containing not more than 6 carbon atoms, said reaction being effected in the presence of a basic metal alcoholate, and separating the formed carboxylic acid ester of said monohydric alcohol from the reaction mixture substantially as fast as formed.

7. A process for the production of a polymer of a beta,gamma-monoolefinic monohydric alcohol having the carbon atom of a terminal methylene group as one of the olefinic carbon atoms, which comprises heating and reacting the ester of said polymeric alcohol and a saturated fatty acid with a monohydric primary alcohol containing not more than 4 carbon atoms, said reaction being effected in the presence of a basic metal alcoholate while distilling the formed fatty acid ester of said monohydric alcohol from the reaction mixture substantially as fast as formed.

8. A process for the production of a polymer of a beta,gamma-monoolefinic monohydric primary alcohol having the carbon atom of a terminal methylene group as one of the olefinic carbon atoms and having not more than 6 carbon atoms, which comprises heating and reacting the ester of said polymeric alcohol and a saturated fatty acid with monomer of said monoolefinic alcohol while distilling the formed fatty acid ester of said monomeric alcohol from the reaction mixture substantially as fast as formed.

9. A process for the production of a polymer of a beta,gamma-monoolefinic monohydric primary alcohol having the carbon atom of a terminal methylene group as one of the olefinic carbon atoms and having not more than 6 carbon atoms, which comprises heating and reacting a carboxylic acid ester of said polymeric alcohol with monomer of said monoolefinic alcohol, said reaction being effected in the presence of a basic metal alcoholate while separating the formed carboxylic acid ester of said monomeric alcohol from the reaction mixture substantially as fast as formed.

10. A process for the production of a polymer of a beta,gamma-monoolefinic monohydric alcohol having the carbon atom of a terminal methylene group as one of the olefinic carbon atoms, which comprises heating and reacting a carboxylic acid ester of said polymeric alcohol with a monohydric alcohol from the class consisting of primary and secondary alcohols containing not more than 6 carbon atoms, said reaction being effected while separating the formed carboxylic acid ester of said monohydric alcohol from the reaction mixture substantially as fast as formed.

DAVID E. ADELSON.
THEODORE W. EVANS.

REFERENCES CITED

The following references are of record in the file of this patent:

UNITED STATES PATENTS

| Number | Name | Date |
|---|---|---|
| 1,672,156 | Herrmann et al. | June 5, 1928 |
| 2,072,015 | Tamele et al. | Feb. 23, 1937 |
| 2,072,016 | Tamele et al. | Feb. 23, 1937 |
| 2,109,883 | Herrmann et al. | Mar. 1, 1938 |
| 2,135,626 | Roble | Nov. 8, 1938 |
| 2,139,115 | Engs et al. | Dec. 6, 1938 |
| 2,155,591 | Garvey | Apr. 25, 1939 |
| 2,164,188 | Groll et al. | June 27, 1939 |
| 2,274,864 | Lieber et al. | Mar. 3, 1942 |
| 2,318,959 | Muskat et al. | May 11, 1943 |
| 2,332,460 | Muskat et al. | Oct. 19, 1943 |
| 2,332,900 | D'Alelio | Oct. 26, 1943 |

OTHER REFERENCES

Ryan et al., Polymerization of Beta-Methallyl Alcohol, etc., article in Journ. A. Chem. Soc., vol. 62, page 3469, December 1940.